April 6, 1954     J. A. GIBBONS     2,674,544
METHOD OF MANUFACTURING A SCREEN MATRIX
Original Filed July 26, 1948     3 Sheets-Sheet 1

INVENTOR.
JAMES A. GIBBONS
BY
ATTORNEY

April 6, 1954     J. A. GIBBONS     2,674,544
METHOD OF MANUFACTURING A SCREEN MATRIX
Original Filed July 26, 1948     3 Sheets-Sheet 2
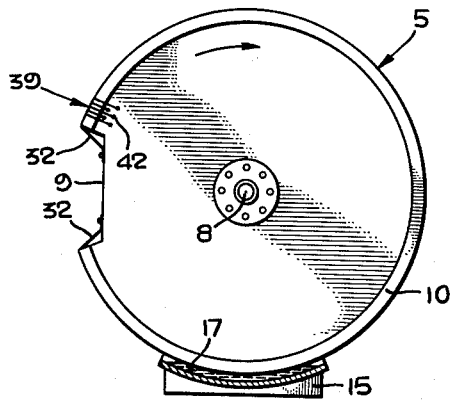
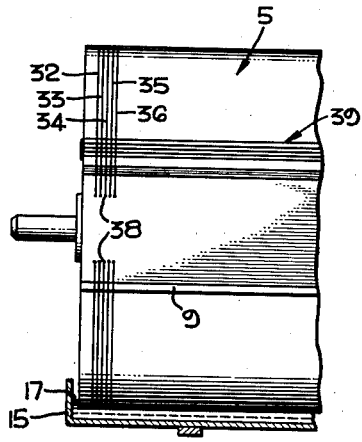
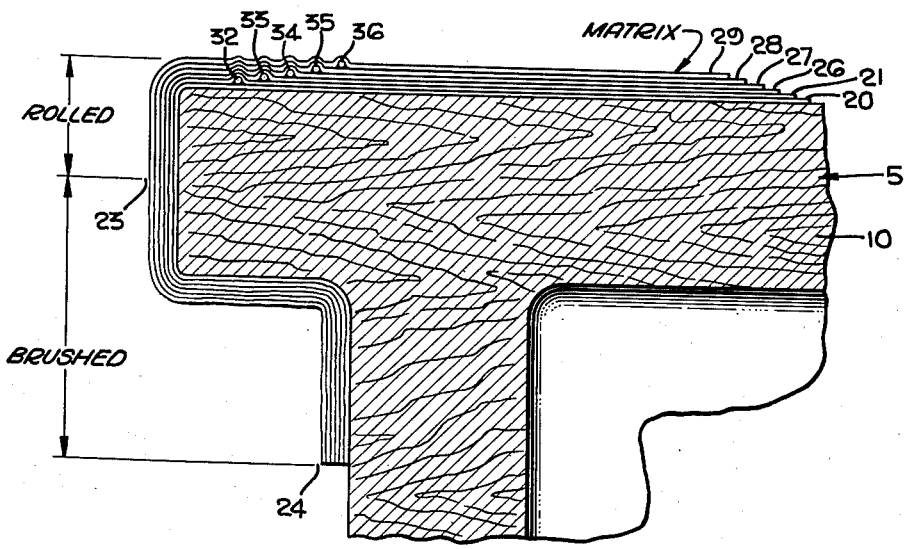
INVENTOR.
JAMES A. GIBBONS
BY
ATTORNEY April 6, 1954   J. A. GIBBONS   2,674,544
METHOD OF MANUFACTURING A SCREEN MATRIX
Original Filed July 26, 1948   3 Sheets-Sheet 3

INVENTOR.
JAMES A. GIBBONS
BY
Orl R. Goslow
ATTORNEY

Patented Apr. 6, 1954

2,674,544

UNITED STATES PATENT OFFICE 2,674,544

METHOD OF MANUFACTURING A SCREEN MATRIX

James A. Gibbons, North Hollywood, Calif., assignor to Warner Bros. Pictures, Inc., Burbank, Calif., a corporation of Delaware Original application July 26, 1948, Serial No. 40,667. Divided and this application April 3, 1951, Serial No. 218,969

13 Claims. (Cl. 117—64)

This invention relates to a method of manufacturing screens, such as light reducing screens or similar types of plastic screens, for use in the production or showing of motion pictures. This application is a division of application Ser. No. 40,667, filed July 26, 1948, entitled "Apparatus for Manufacturing Screens," now U. S. Patent No. 2,558,244 of June 26, 1951.

In my copending application, Ser. No. 40,666, filed July 26, 1948, now U. S. Patent No. 2,558,243 of June 26, 1951, a method of making and using a neutral density light reducing screen has been disclosed and claimed, such a screen being produced on apparatus and on a matrix made by the method described hereinafter. The matrix consists of a plurality of layers, some of which are applied in more than one coat, each layer having a specific function. The apparatus for forming or casting the matrix layers, claimed in the above mentioned parent application, includes a cylindrical drum especially constructed, and which may be varied in rotation to vary the application of each layer. It has also been found that by arranging strings between certain layers of the matrix, different layers may be removed in the event of damage to only certain of the layers. Therefore, an entirely new matrix need not be cast. The present apparatus is flexible to produce both the matrix and screens having the desired light diffusing, absorbing, and transmitting qualities.

The principal object of the invention, therefore, is to facilitate the manufacture of light diffusing or transmitting screens.

Another object of the invention is to provide an improved method of manufacturing light transmitting or diffusing screens.

A further object of the invention is to provide an improved method of controlling the application of solutions to a large surface to provide both a matrix and the light screens formed thereon.

A still further object of the invention is to provide an improved method of forming and removing a screen after the formation thereof.

Although the novel features which are believed to be characteristic of this invention will be pointed out with particularity in the appended claims, the manner of its organization and the mode of its operation will be better understood by referring to the following description, read in conjunction with the accompanying drawings, forming a part hereof, in which:

Fig. 3 is an end view of the drum and dip-pan in a different relationship to that shown in Fig. 1.

Fig. 4 is a partial front view of a drum showing the arrangements of the cutting cords for the removal of different layers of the matrix.

Fig. 5 is a cross-sectional view of a section of the drum showing the method of application of the various coats and layers of the matrix.

Figure 1:
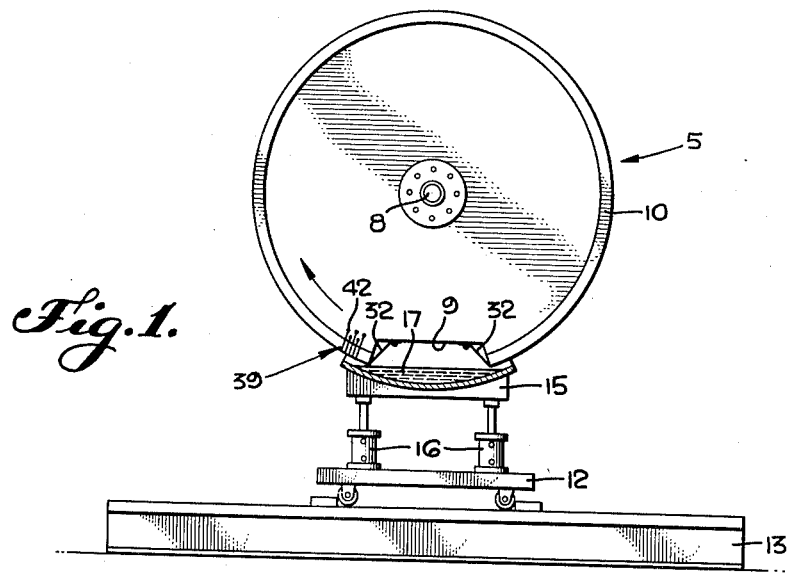
Fig. 1 is an end view of the drum and solution tank embodied in and for performing the invention.
Figure 2:
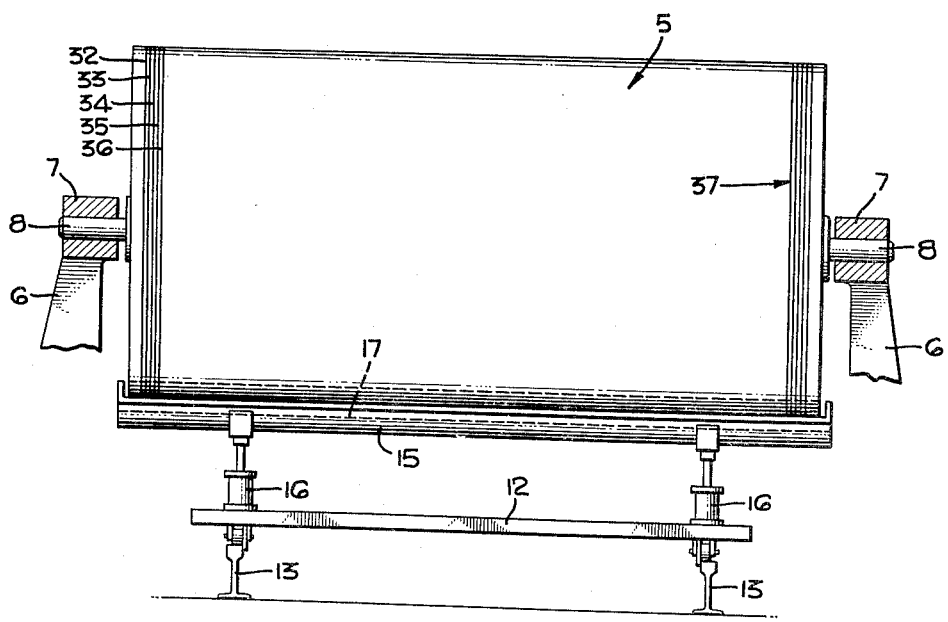
Fig. 2 is a front, elevational view of the tank and dip-pan of Fig. 1.

Referring now to the drawings, in which the same numerals identify like elements, a cylindrical drum 5 is constructed of suitable materials such as wood 10 and of a size desired for the manufacture of the largest screen. The drum being described is approximately five feet, ten inches, in diameter. The facing material is of kiln-dried fine grain wood of medium hardness to give a smooth constant convex surface from the axis of the drum. It is water-proof glued and coated on its inner surface to resist moisture absorption. The drum has axles 8 mounted on solid non-vibrating pylons 6 in bearings 7. The drum is hollow and has a longitudinal slot 9 cut therein, as shown in Figs. 1, 3, and 4. The slot is sufficient in width so that its edges may clear the liquid to be applied in rotation. The present slot was approximately fifteen inches in width. The drum is connected through a chain or belt to a driving motor (not shown), which may have its speed controlled so that any desired speed of rotation of the drum 5 may be obtained.

Mounted on a truck 12, which is movable on a track 13, is a stainless steel dip-pan 15, the pan being mounted on a pair of hydraulic screw jack elevators 16 so that the pan may be raised or lowered for removing the liquid from the drum, and for cleaning the pan 15, or for changing liquids. The pan has a concave curvature of approximately the same radius as the drum 5, the closed ends of the pan extending at least one inch beyond the ends of the drum. As shown in Figs. 1 and 3, a liquid solution 17 of the various types explained hereinafter is placed in the pan 15. Optimum level of the solution 17 is such that the width of the surface of the solution is approximately seventeen inches.

The face of the drum is trued for curvature by rotation of the drum during lateral movement of a cutting and sanding tool mounted on a nondeviating track parallel to the axis of the drum. After the face of the drum is completed, it is treated with a layer 20 of a furfural aldehyde resin or plastic such as "Furane X2" with an acid catalyst added, and kept at an approximate temperature of one hundred degrees F. to accelerate the curing of the resin. This layer will be referred to hereinafter as furfural plastic. This is the first layer of the matrix and approximately six coats are applied, each coat being cured before the next coat is applied. Adjustment is made to allow for thickness of these furfural plastic coats, and the face of the drum re-trued with coarse-cut to fine-cut as finish is approached by rotation of the drum and lateral movement of the sanding tool as set up previously. The drum is mounted in a suitable dust-proof room or housing, in which there is a door for accommodating the pan 15 and inspection windows. The room or housing is then supplied with dust-free air at an approximate humidity of fifty percent, the air being heated to approximately eighty-five degrees F. to assist in relieving the solvents from the deposited resins.

Three coats of a layer 21 of the following formula are then applied directly on the furfural plastic surface, the formula being referred to as "M-3," for the purpose of explanation:

| | | |
|---|---|---|
| Ethyl cellulose | gms | 744 |
| Xylol | cc | 3468 |
| Ethylene glycol monomethyl ether | cc | 827 |
| Butyl alcohol | cc | 827 |
| Methyl isobutyl ketone | cc | 827 |
| Methyl phthalyl ethyl glycollate | cc | 48 |

Figure 6:
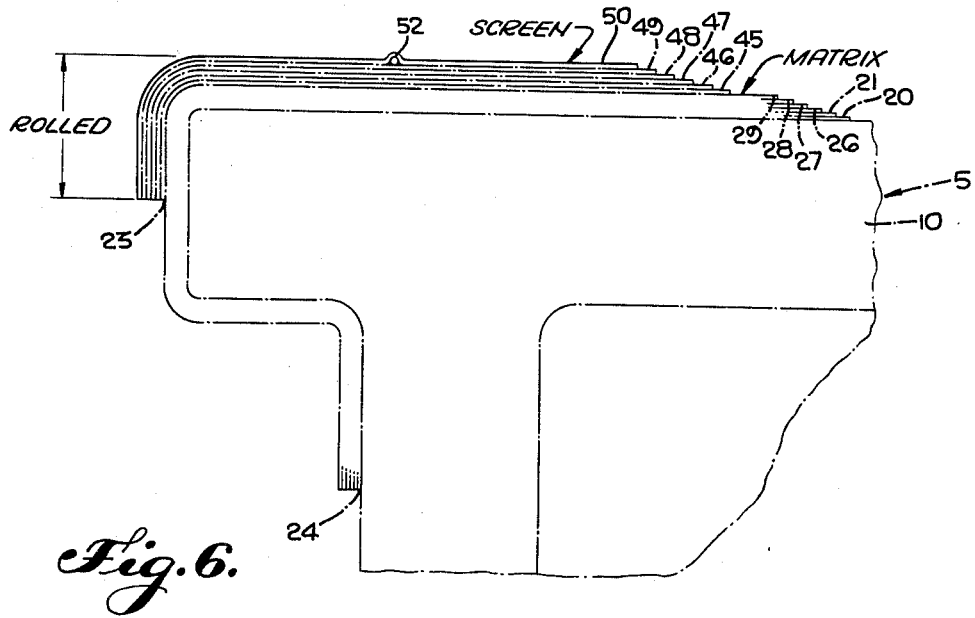
Fig. 6 is a detailed cross-sectional view, similar to Fig. 5, showing the final application of the screen upon the matrix.

Each coat of M-3 is applied at a drum speed of one revolution in sixteen minutes, each coat being dried under blower and heat. This is a non-hydroscopic layer and is for the purpose of preventing the water of the next layer from entering the pores of the furfural plastic and getting into the wood of the drum 5. Since the furfural plastic and M-3 layers reach only to the point 23 by the rolling process (see Figs. 5 and 6), the solution is brushed on from point 23 to point 24 to protect the drum and to insure that the matrix extends beyond the screen edges. The other coats of the matrix now to be described are also similarly brushed on between points 23 and 24, the screen layers cast on the matrix extending only to point 23.

The next layer 26 of the matrix is a low viscosity water soluble polyvinyl alcohol, and hereinafter referred to as PVA. This solution is made by slowly adding 1500 grams of polyvinyl alcohol to 5450 cc. of distilled water at between seventy and eighty degrees C. Then, mixing one hundred cc. of distilled water with six grams of a surface tension reducing agent, such as sodium sulfonate of an alkyl oleate, and three hundred grams of Tricesyl phosphate. The two solutions are then mixed, and sufficient water is added to make 1000 cc., the final solution being filtered and allowed to stand twelve hours before placing in pan 15. One hour setting time in the pan is allowed for checking for bubbles and removing any that exist. This layer forms a protection to the finish of the drum by withholding active solvents from the furfural plastic coat.

This polyvinyl alcohol layer 26 is a single coat and is applied in one revolution of the drum in fourteen minutes, then dropping the pan and revolving the drum at the rate of eight minutes per revolution until the coat is dried, air and heat being applied. The approximate drying time is four hours. To prevent flow back as the viscosity changes by application, the fourteen minute speed is maintained for approximately ¼ revolution of the drum before it is increased to the eight minute speed. The edges between points 23 and 24 are brushed on as for the first layers.

The next layer 27 is two coats of a copolymer of vinyl chloride and vinyl acetate solution made up as follows:

| | | |
|---|---|---|
| Vinyl acetate vinyl chloride copolymer | gms | 500 |
| Butyl acetate | cc | 2625 |
| Methyl phthylate-ethyl glycollate | cc | 37.5 |

The viscosity of this solution is adjusted to thirty-seven at twenty-four degrees C., the plasticizer, methyl phthylate ethyl glycollate, being put into solution at seventy degrees C. The solution is applied at one revolution in sixteen minutes.

The M-3 coats applied to the furfural plastic face are not solvent reactive, and, as mentioned above, prevent pitting reaction against the PVA layer that protects the drum face from solvent damage of later layers. The copolymer of vinyl chloride and vinyl acetate layer prevents a reaction of the contained water in the polyvinyl coating, and the acetone of the next layer 28, which will be called for purposes of description 8.3, and which is as follows:

| | | |
|---|---|---|
| Cellulose acetate | gms | 400 |
| Acetone | cc | 1995 |
| Ethanol | cc | 215 |
| 2 nitro propane | cc | (715) |
| Ethylene glycol monomethyl ether acetate | cc | (715) |
| Toluene | cc | (383) |
| Methyl phthylate ethyl glycollate | cc | 200 |

The three bracketed dilutents are used to adjust viscosity to thirty-seven at twenty-four degrees C. This layer is applied in three coats, each coat at a speed of one revolution of the drum in twelve minutes, the edges being well brushed for binding the acetate to the drum. The 8.3 layer 28 is plasticized to check shrinkage tension from reaching the breaking point.

The last layer 29 of the matrix is called 8.3M, it being the same as the 8.3 layer 28, except that it is unplasticized. Two coats of 8.3M are applied at a drum speed of one revolution per coat in twelve minutes, the drying time being twelve hours. The purpose of this layer is to provide an exceptionally high gloss and smooth surface to the matrix necessary for filter clarity. The plasticized layer 8.3 would give a slight diffusion (star gaze), which is detrimental to the clarity of images in the final filter screen made thereon. All viscosities are based on Stromer Viscometer readings, one minute time, one hundred gm. weight.

Referring to Figs. 4 and 5, a plurality of five strings or cords 32 to 36, inclusive, are shown interposed between the various layers just described. The cord 32 is on top of layer 20 and under layer 21, each cord being laid and the ends fastened by tacks or other suitable means at 38. A similar set of cords 37 is employed at the other end of the drum. Horizontal cords, such as shown at 39, are inserted between the layers and tacked at their ends as shown at 42 in Fig. 3. It will be noted that no horizontal cords are along the other side of slot 9, but are on the trailing edge of the surface. This cord arrangement prevents the cords' picking up an excess of solution and causing flow back which forms streaks.

The purpose of the cords is to permit any number of layers of the matrix to be stripped from the drum without going down to the furfural plastic layer whenever certain layers of the matrix have been damaged. For instance, if the damage only extends through the outside two layers, then by pulling strings 35, the upper two layers will be cut and may be easily removed from the matrix, new layers then being applied. Each layer is thus accessible, and the entire matrix need not be removed when only one or more of the outside layers need replacing. In most instances, cutting cords 36 between the 8.3 and 8.3M layers is sufficient, as the damage does not usually extend beyond the 8.3M layer.

Figure 7:
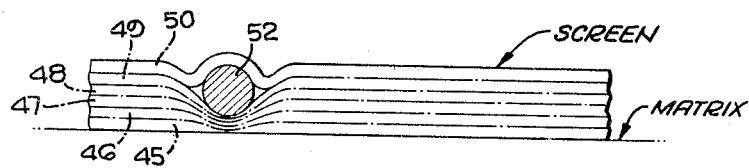
Figs. 7 and 8 are detailed views of the screen after application of the screen and dye.
Figure 8:
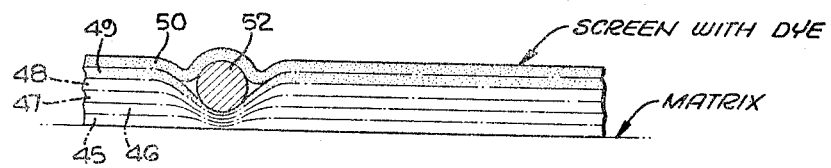

The matrix is now ready for the manufacture of neutral or dyed screens such as described in my above mentioned copending application. For instance, the base of a dyed screen may be made from the above M-3 formula, six coats 45 to 50, inclusive (see Figs. 6, 7, and 8), providing a screen approximately .007 inch thick. The viscosity of the solution and speed of rotation of the drum are adjusted to give free flow and great leveling power. Although the screen has been shown in Figs. 6, 7, and 8 in layers, for illustration, it actually becomes homogeneous upon drying, no lines of demarkation between coats being visible.

The final coat should be dried two hours before applying the following dye and solvent formula, which provides a neutral density of substantially sixty-five percent absorption and one providing a balance between the light intensity of a bright sun and normal interior illumination:

Solvents:
    Benzyl alcohol_____cc__   150
    Butyl alcohol_____cc__   450
    Methyl cellosolve_____cc__   300
    Ethylene dichloride_____cc__   225
    Pent acetate_____cc__    75
    Ethanol _____cc__  1125
    Butyl cellosolve_____cc__   675
Dye:
    Methyl red (concentrated)_____gms__ 6.444
    Methyl blue (concentrated)_____gms__    10
    Methyl yellow (concentrated)____gms__ 12.333

The dye solvents and filter dye solution are absorbed by the M-3 layer to various extents, depending upon the speed of the matrix or drum. For instance, over each three feet of a matrix surface, the speed may be varied to provide test strips from which a graph of light transmission or absorption versus drum speed may be made. The correct drum speed for a certain value of absorption is thus found for producing the final screens. If the above dye proportions are not correct to bring the desired absorption value within the limits of drum speeds necessary for uniform application of the dye coat, the dye solution may be strengthened or weakened in the same proportions as given above.

As explained in connection with the matrix, a cord 52 is shown just under the outside layer 50, this cord being at one end of the drum, another similar cord being at the other end of the drum, and one cord being strung lengthwise of the drums as shown at 39. The solvents cause the cord to shrink, and it becomes integral with all layers of the screen so that by removing the cord 52, the screen is cut to the 8.3M layer of the matrix, and thus, easily stripped therefrom without damage to the matrix. The showing of the cord 52 and screen layers are enlarged and exaggerated to illustrate the embedding action of the cord.

In addition to the manufacture of the light balancing or absorbing screen just described, rear-projection light diffusing screens for process photography or picture exhibition may also be formed with the apparatus of the invention. In making such screens, the same matrix is used as for the filter screens, except that the 8.3M, or last layer of the matrix on which the screen is formed, is changed to a layer containing a grit for introducing light diffusion. This layer is similar to the 8.3 and 8.3M layers and has the following formula:

Cellulose acetate_____gms__  659
Acetone _____cc__  1112
Ethanol _____cc__   215
2 nitro propane_____cc__  2000
Methyl cellosolve acetate_____cc__  1334
Toluene _____cc__   890
Methyl phthylate-ethyl glycollate (plasticizer) _____cc__   329
600 carborundum grit_____gms__  908

The cellulose acetate is first dissolved in the acetone and ethanol to which the plasticizer and grit are added. The mixture of nitro propane, methyl cellosolve and toluene then dilutes the formula to a viscosity of ninety-three at twenty-two degrees C. This layer is applied to the 8.3 layer in one or two coats, each coat being applied in one revolution of the drum in fourteen minutes, which evenly and uniformly distributes the grit over the matrix.

To form a rear-projection screen, the same method of forming the base of the filter screen is followed, the grit in the last matrix layer providing a light diffusing surface which is efficient and uniform over its entire surface. Cutting strings for the removal of the screen may be used in the same manner as described above for removing the filter screens from the matrix.

I claim:
1. The method of constructing a matrix on which light screens are formed, comprising forming a layer of a furfural aldehyde plastic by applying a solution thereof to a rotatable moisture resistant cylindrical surface by rotation of said cylindrical surface in said solution of furfural plastic, drying said layer, making said furfural plastic layer truly cylindrical by rotation thereof against a smoothing element moving parallel with the axis of rotation of said furfural plastic surface, applying a water checking layer of ethyl cellulose on said furfural plastic surface, applying a layer of polyvinyl alcohol, applying a layer of a copolymer of vinyl chloride and vinyl acetate, applying a layer of plasticized cellulose acetate, finally applying a layer of unplasticized cellulose acetate, all of said layers being applied in different numbers of coats by rotation of the base through respective solutions of said layers, and drying said respective coats and layers after each application thereof.

2. The method in accordance with claim 1, in which said furfural plastic layer is formed of approximately six coats, each coat being dried before the application of the next coat, and said water checking layer is applied in three coats, each coat being dried before the application of the next coat, the surface speed of said furfural plastic through said water checking solution being approximately one foot per minute.

3. The method in accordance with claim 1, in which the layer of polyvinyl alcohol is applied in a single coat at a rate of movement of said water checking layer surface through said polyvinyl alcohol solution of approximately one and one-third foot per minute, said rate of movement being increased after said application and during the drying period.

4. The method in accordance with claim 1, in which the layer of a copolymer of vinyl chloride and vinyl acetate is applied by rotation of the polyvinyl alcohol layer through the copolymer solution at a rate of approximately one foot per minute, this layer consisting of substantially the following:

| | | |
|---|---|---|
| Copolymer of vinyl chloride and vinyl acetate | gms | 500 |
| Butyl acetate | cc | 2625 |
| Methyl phthylate-ethyl glycollate | cc | 37.5 |

5. The method in accordance with claim 1, in which the plasticized cellulose acetate layer is made up of a solution of substantially the following formula:

| | | |
|---|---|---|
| Cellulose acetate | gms | 400 |
| Acetone | cc | 1995 |
| Ethanol | cc | 215 |
| 2 nitro propane | cc | 715 |
| Ethylene glycol monomethyl ether acetate | cc | 715 |
| Toluene | cc | 383 |
| Methyl phthylate ethyl glycollate | cc | 200 | and the final layer is unplasticized cellulose acetate, said plasticized cellulose acetate layer being applied by passing said copolymer layer through a solution of said plasticized cellulose acetate at a speed of substantially one foot per half minute, three coats forming said plasticized cellulose acetate layer, said unplasticized cellulose acetate layer being applied in two coats at the same rate, and drying said respective coats and layers after each application thereof.

6. The method of forming a matrix on which screens are formed, comprising rotating a curved moisture resistant surface in a solution of a furfural aldehyde plastic to form a layer thereof on said surface, rotating said layer of furfural plastic formed on said surface in a water checking solution of ethyl cellulose to form a layer thereof on said furfural layer, rotating said water checking layer in a solution of polyvinyl alcohol to form a layer thereof on said water checking layer, rotating said layer of polyvinyl alcohol in a solution of a copolymer of vinyl chloride and vinyl acetate to form a layer thereof on said polyvinyl alcohol layer, rotating said layer of a copolymer of vinyl chloride and vinyl acetate in a solution of plasticized cellulose acetate to form a layer thereof on said copolymer layer, and rotating said layer of plasticized cellulose acetate in a solution of unplasticized cellulose acetate to form a layer thereof on said layer of plasticized cellulose acetate, and drying said respective coats and layers after each application thereof.

7. The method in accordance with claim 6, in which the application of said layers is made in a dust-proof room having a humidity of substantially fifty percent and a temperature of approximately eighty-five degrees F.

8. The method in accordance with claim 6, in which said furfural plastic layer is applied in six separate coats, each coat being dried before the application of the next coat.

9. The method in accordance with claim 6, in which said water checking layer is applied in three separate coats, each coat being dried before the application of the next coat, said furfural plastic layer being passed through said water checking solution at approximately one foot per minute.

10. The method in accordance with claim 6, in which said polyvinyl alcohol layer is applied as a single coat, said water checking layer being passed through said polyvinyl alcohol solution at approximately 1⅓ feet per minute.

11. The method in accordance with claim 6, in which said layer of the copolymer of vinyl chloride and vinyl acetate is applied in three separate coats at a Stromer viscosity reading of thirty-seven at twenty-four degrees C., each coat being allowed to dry before the application of the next coat, said layer of polyvinyl alcohol being passed through said copolymer solution at approximately 1½ feet per minute.

12. The method in accordance with claim 6, in which said layer of plasticized cellulose acetate is applied in three separate coats at a Stromer viscosity reading of thirty-seven at twenty-four degrees C., each coat being dried before the application of the next coat, said copolymer layer being passed through said plasticized cellulose acetate solution at approximately 1½ feet per minute.

13. The method in accordance with claim 6, in which said unplasticized cellulose acetate layer is applied in two separate coats, each coat being dried before the application of the next coat, said plasticized cellulose acetate layer being passed through said solution of unplasticized cellulose acetate at approximately 1½ feet per minute.

References Cited in the file of this patent

UNITED STATES PATENTS

| Number | Name | Date |
|---|---|---|
| 2,480,824 | Murphy et al. | Sept. 6, 1949 |